Patented Dec. 6, 1927.

1,651,694

UNITED STATES PATENT OFFICE.

MATTHEW GREEN, OF DETROIT, ELMER M. JONES, OF ADRIAN, AND HOBART H. WILLARD, OF ANN ARBOR, MICHIGAN, ASSIGNORS TO PARKER RUST-PROOF COMPANY, OF DETROIT, MICHIGAN, A CORPORATION OF MICHIGAN.

RUSTPROOFING.

No Drawing.  Application filed January 25, 1926. Serial No. 83,736.

Our invention relates to the art of rust-proofing iron by coating articles composed of, or containing, iron, with a layer of insoluble phosphates. Iron and some other metals form a series of phosphates, some of them soluble and some insoluble. When properly treated, iron may be coated with a layer of insoluble phosphates. The patent to Coslett, No. 870,937, issued November 12th, 1907, clearly states a process which has been extensively used, with some modifications and improvements, for accomplishing this purpose.

Our present invention relates to an improvement whereby we produce a rust-proofing material which may be used to form a rust-proofing solution. We produce this material in dry form, so that it may be shipped and handled conveniently.

There are many different phosphates of iron, formed in accordance with different conditions. These phosphates vary from high acid to basic phosphates and also differ in accordance with the form of phosphoric acid, whether metaphosphoric acid, orthophosphoric acid, or pyrophosphoric acid. The insoluble phosphates are not formed upon the surface of iron in a solution containing phosphoric acid until there is present in the bath a series of phosphates. From our investigation, it appears that the essential components of a rust-proofing bath are ferrous di-hydrogen ortho-phosphate, with some free orthophosphoric acid, and some ferrous monohydrogen phosphate. When the di-hydrogen phosphate and free acid are present in the bath where iron surfaces are exposed, some of the iron is attacked and some monohydrogen phosphate is formed. The monohydrogen phosphate is very slightly soluble in the ordinary rust-proofing bath. The deposition of the coating upon the iron does not begin until the bath, at least that portion of it in contact with the iron, is saturated with monohydrogen phosphate. This requires only a small fraction of 1% in the ordinary bath. When di-hydrogen phosphate is dissolved in water, hydrolytic dissociation, or hydrolysis, results in the production of some free acid and of sufficient monohydrogen phosphate to saturate the solution. Therefore, when considering the materials to be placed in a bath for rust-proofing purposes, the monohydrogen phosphate may be disregarded.

Metaphosphates and pyrophosphates of rust-proofing metals, and ferric orthophosphates, are substantially insoluble in rust-proofing solutions. These have been introduced into a rust-proofing bath, but have no rust-proofing action except as there is a certain amount of rearrangement of the atoms whereby phosphoric acid is freed in the solution, which phosphoric acid acts in the same way as though it were directly introduced into the bath in accordance with the procedure described by Coslett in the above mentioned patent.

Our first object, therefore, is to produce as pure as practicable ferrous di-hydrogen orthophosphate, or similar phosphates of other metals. The production of the ferrous phosphate will be described first. In order to produce this, we first introduce iron filings or small particles of metallic iron into a strong solution of orthophosphoric acid. The degree of concentration of the acid may vary considerably under different conditions, but for reasons which will be stated later we prefer a concentration of between 60% and 75%.

We have found it preferable to heat the acid to about 100° C., or to keep the acid solution between this temperature and the boiling point, which is about 115° C., for a 65% solution. The filings are introduced slowly to avoid excessive foaming, and the solution should be agitated until the filings are substantially all dissolved. The time required for dissolving the iron depends upon the strength of the solution, the condition of the iron, the temperature, and the depth of the receptacle in proportion to the depth of acid. With the concentration and temperatures stated above, a satisfactory amount of iron may be dissolved in the solution in about one hour if there is room in the receptacle for the solution to froth to about five times its original volume. If there is less room for frothing, more time is required to dissolve the iron.

When the iron dissolves in the acid, hydrogen is given off. At the same time there will be a certain amount of water vapor passing off. This hydrogen and water vapor act to prevent any great degree of contact between air and the solution. This effect may be increased by covering the receptacle, leaving only a necessary vent opening for the evolved hydrogen and escaping water vapor, so that the surface of the solution is blanketed with these gases and air is excluded. It is undesirable to have air in free contact with the solution because there is a tendency for ferrous di-hydrogen phosphate to oxidize and thereby assume a less soluble form. The amount of iron which is dissolved in a given amount of solution may be varied to a considerable extent according to circumstances, but we have found the proportion of about one part of iron to about ten parts by weight of a 65% solution of phosphoric acid to give satisfactory results.

After a solution has been formed in the above related manner, the next step is to filter it. This may be done in any suitable manner. The purpose of filtering is to remove any insoluble impurities in the solution, such as carbon, which is ordinarily introduced with the iron, and any remaining portions of undissolved iron. Undissolved iron in the rust-proofing material greatly decreases its efficiency, as the rust-proofing bath acts upon this iron and uses up its strength thereon as well as acting upon the work which is to be rust-proofed, so that a much less amount of rust-proofing can be done by a given amount of material if metallic iron is introduced with the rust-proofing material.

After the solution has been filtered it is placed in a crystallizing tank. This tank may be furnished with coils through which either steam or cold water may be passed. Ferrous phosphate is more readily soluble in a 50% solution of phosphoric acid than it is in a solution of higher degree of concentration. As the purpose of the crystallizing step is to crystallize out as much ferrous di-hydrogen phophate as possible from the solution, it is desirable to have a fairly strong solution in the crystallizing tank. If the solution coming from the filter is weaker than desired, water may be driven off by passing steam through the pipes and heating the solution until the desired degree of concentration is reached. However, we prefer ordinarily to carry out the process so that the solution will be approximately the proper degree of concentration when the crystallizing tank is reached.

In order to precipitate the crystals in the crystallizing tank cold water is passed through the pipes. We have found it preferable to carry out this crystallizing operation somewhat slowly, as this results in the formation of larger crystals, and the larger crystals are somewhat preferable for reasons which will be stated later.

The crystals are placed in a centrifugal dryer and thoroughly drained. The mother liquor may be returned to the dissolving tank.

After the crystals are removed from the centrifuge they should be thoroughly and promptly dried, with the least practicable exposure to oxidizing influences, because damp crystals in the presence of air are oxidized, so as to render a considerable portion insoluble. Therefore, there should not be any water present in the crystallized product except that entering into the crystals as water of crystallization. The crystals retain their water of crystallization if dried not above 60° C. The crystals, dried as indicated, do not take up dampness from the air, and, therefore, when once thoroughly dried, are relatively stable when exposed to ordinary atmosphere. However, there is always some danger of oxidation resulting from the presence of both moisture and air, and the larger crystals are preferable to smaller crystals because a less amount of surface is exposed to such oxidation.

As previously stated, we prefer to use from 60% to 75% acid. When this strength of acid is used, and the volume is maintained substantially constant until crystallization is begun, a good yield of satisfactory crystals is obtained. If 50% acid is used, and the volume is maintained substantially constant until crystallization is begun, there is a small yield of poor crystals, partly because the ferrous di-hydrogen phosphate is much more soluble in this strength of acid than in the stronger acid. If 85% acid is used, as before, it is difficult to produce satisfactory crystallization. The solution may be brought to the proper strength at the time of crystallization, when the acid originally used does not result in the proper strength, but we prefer to use acid of such strength that the solution requires little or no correction in order to produce proper crystallization.

Manganous dihydrogen phosphate may be made in substantially the same way as the similar ferrous salt. The most important modifications are that slightly more manganese than iron is required to produce the same degree of saturation in the solution, and that it is unnecessary to guard against oxidation of the manganese phosphate.

It is sometimes desirable to use the manganese and ferrous salts together, and for this purpose ferro-manganese may be used as a convenient source of such manganese as is desired, both the iron and the manganese in the ferro-manganese being converted into phosphates by the same process.

Zinc dihydrogen phosphate may be formed in the same manner as the similar salts of manganese and iron, except that a considerably greater amount of zinc than of iron is required to produce the same degree of saturation in the solution, and greater care is necessary to avoid overheating during drying, as the crystals melt below 60° C.

Ferrous dihydrogen orthophosphate added to water produces a good rust-proofing solution, without the addition of any other material. In starting operations with a rust-proofing tank, when this salt is used alone, it is preferable to boil the solution for an hour or so before introducing the work. Various proportions of the salt may be used. We have been successful with the use of as little as seven pounds of the salt in one hundred and twenty-five gallons of water, and with as much as seventy pounds of salt in the same amount of water. With perfectly clean iron, about fifteen pounds of salt to one hundred and twenty-five gallons of water produces very good results, but we have found that a greater amount produces more rapid results upon imperfectly cleaned iron, and, therefore, have chosen about thirty-five pounds to one hundred and twenty-five gallons of water as our standard strength.

The strength of the solution in the rust-proofing bath decreases as work is coated with insoluble phosphates. As stated above, boiling ferrous dihydrogen phosphate in water results in the production of some monohydrogen phosphate and some free acid. We have found the acidity of the bath a good indicator of the strength of the solution for rust-proofing purposes, and, therefore, a reliable means for determining how much of the salt should be added at any given time to bring the strength of the solution up to normal.

The acidity of the bath may be expressed in points, points being the number of cubic centimeters of tenth-normal alkali required to neutralize ten cubic centimeters of the rust-proofing solution, using phenolphthalein as indicator.

We have found that one pound of the salt to one hundred and twenty-five gallons adds approximately 1 point to the acidity of the solution, when tested by the above mentioned test. When thirty-five pounds of the salt to one hundred and twenty-five gallons of water is used to start the tank, the solution will have about 35 points acidity. Additional amounts of the salt may be added at any desired time to bring the solution back to normal strength; but in ordinary operation, where it is desired to rust-proof continuously through the day, we have found it preferable to add at night the amount of the salt indicated as necessary by the acidity of the bath. For example, if the bath shows 28 points acidity at the close of the day's run, seven pounds of the salt are added to one hundred and twenty-five gallons of the solution. The heat is turned off of the tank at night, so that the bath remains warm, but not boiling. We have found this method of adding the necessary amount of the salt at night and allowing it to remain in the warm, but not boiling, solution for a number of hours, a particularly effective way to bring up the strength of the solution. If the rust-proofing is carried on continuously during 24 hours, replenishing may be accomplished at any convenient time.

Manganous dihydrogen phosphate and zinc dihydrogen phosphate may be used, either alone or in various proportions, with each or with ferrous dihydrogen phosphate, in substantially the same way as described above for the ferrous salt alone. We have found that the use of a mixture of the ferrous and manganous salt does not materially change the amount of salts necessary to produce a given acidity in the bath, but that a materially greater amount of work is rust-proofed in such a bath to lower its acidity a given amount than where the ferrous salt is used alone, and that the coating is somewhat smoother and more resistent to rusting.

The dihydrogen phosphate crystals referred to above may possibly include higher or lower acid forms, or other departures from the exact formula for that salt; but the proportions of the materials are found to be substantially in accordance with the formula $M(H_2PO_4)_2$ plus water of crystallization.

The metals which can be used satisfactorily in rust-proofing are limited by a number of factors. They must form phosphates similar in nature and solubility to the ferrous phosphates, and they must not be below iron in the electro-motive series. Metals in the electro-motive series from manganese to iron, inclusive, meet these requirements. Cadmium is too expensive to be used as a principal ingredient in a rust-proofing material, although some cadmium is frequently found in commercial zinc, and so may be included to some extent in the commercial salt.

Chromium is found, in some tables of the electromotive series, between manganese and iron; but chromium appears to be sometimes electro-negative to iron and sometimes electro-positive to iron, and is not a metal suitable for use in preparing a rust-proofing material in accordance with the method disclosed in this application.

While we have described the specific process which we have found to be satisfactory, and have stated several alternative steps for portions of this process, it will be understood that other changes may be made in the process described, within the scope of the appended claims which define our invention.

What we claim is:

1. The process of making a rust-proofing compound, comprising dissolving a metal of the electro-motive series from manganese to iron, inclusive, in a solution of phosphoric acid and forming a di-hydrogen ortho-phosphate of said metal, crystallizing the phosphate, and removing the crystals from the mother liquor.

2. The process of making a rust-proofing compound, consisting in dissolving a metal of the electro-motive series from manganese to iron, inclusive, in a solution of phosphoric acid, said solution containing more acid than necessary to combine with the metal used to form di-hydrogen ortho-phosphate of said metal, crystallizing the phosphate formed in the solution, and removing the crystals from the mother liquor.

3. The process of making a rust-proofing compound, consisting in dissolving a metal of the electro-motive series from manganese to iron, inclusive, in a solution of phosphoric acid, the acid in said solution being in excess of the amount required to combine with the metal used to form di-hydrogen orthophosphate of said metal, maintaining the solution at around 100° C. until substantially all of the metal is dissolved, crystallizing the phosphate formed in the solution, and removing the crystals from the mother liquor.

4. The process of making a rust-proofing compound, consisting in dissolving a metal of the electro-motive series from manganese to iron, inclusive, in a solution of phosphoric acid, the acid in the solution being in excess of that required to combine with the metal used to form di-hydrogen orthophosphate of said metal, maintaining the solution at a temperature of about 100° C. until the metal is substantially all dissolved, filtering the solution while still hot, crystallizing the phosphate formed in the solution, and removing the crystals from the mother liquor.

5. The process of making a rust-proofing compound, consisting in dissolving a metal of the electro-motive series from manganese to iron, inclusive, in a solution of 60% to 75% phosphoric acid and forming a di-hydrogen orthophosphate of said metal, crystallizing the phosphate, and removing the crystals from the mother liquor.

6. The process of making a rust-proofing compound, consisting in dissolving a metal including iron in a solution of phosphoric acid and forming ferrous di-hydrogen orthophosphate, crystallizing the phosphate, removing the crystals from the mother liquor, and drying the crystals under substantially non-oxidizing conditions.

7. The process of making a rust-proofing compound, consisting in dissolving a metal including iron in a 60% to 75% solution of phosphoric acid and forming ferrous di-hydrogen orthophosphate, the acid in the solution being in excess of that required to combine with the iron to form a phosphate, maintaining the solution hot until the iron is substantially all dissolved, filtering the solution while still hot, crystallizing the phosphate from the solution, removing the crystals from the mother liquor, and drying the crystals under substantially non-oxidizing conditions.

8. The process of making a rust-proofing compound, consisting in dissolving iron and manganese in a solution of phosphoric acid, the phosphoric acid in the solution being in excess of that required to combine with the iron and manganese to form ferrous and manganous di-hydrogen orthophosphate, crystallizing the phosphates, removing the crystals from the mother liquor, and drying the crystals under substantially non-oxidizing conditions.

9. The process of making a rust-proofing compound, consisting in dissolving ferro-manganese in a hot solution of phosphoric acid, the acid in the solution being in excess of that required to combine with the iron and manganese to form ferrous and manganous dihydrogen orthophosphates, cooling the solution and crystallizing the phosphates, removing the crystals from the mother liquor, and drying them.

10. A rust-proofing compound consisting of granular or powdery, substantially pure, high acid phosphates of iron and manganese, the proportions of the materials corresponding approximately to the formula $M(H_2PO_4)_2$ plus water of crystallization.

In testimony whereof we have hereunto signed our names to this specification.

MATTHEW GREEN.
ELMER M. JONES.
HOBART H. WILLARD.